(12) United States Patent
Kaido et al.

(10) Patent No.: US 8,685,264 B2
(45) Date of Patent: Apr. 1, 2014

(54) SLIDE MEMBER AND METHOD FOR THE PRODUCTION THEREOF

(75) Inventors: Masataka Kaido, Toyota (JP); Atsushi Suzuki, Okazaki (JP); Masatsugu Shimomura, Sendai (JP); Hiroshi Yabu, Sendai (JP); Yuji Hirai, Sendai (JP)

(73) Assignees: Toyota Jidosha Kabushiki Kaisha, Aichi-ken (JP); Tohoku University, Sendai-shi, Miyagi (JP)

( * ) Notice: Subject to any disclaimer, the term of this patent is extended or adjusted under 35 U.S.C. 154(b) by 0 days.

(21) Appl. No.: 13/822,138

(22) PCT Filed: Sep. 12, 2011

(86) PCT No.: PCT/IB2011/002110
§ 371 (c)(1),
(2), (4) Date: Mar. 11, 2013

(87) PCT Pub. No.: WO2012/035397
PCT Pub. Date: Mar. 22, 2012

(65) Prior Publication Data
US 2013/0168351 A1 Jul. 4, 2013

(30) Foreign Application Priority Data
Sep. 13, 2010 (JP) ................................ 2010-204602

(51) Int. Cl.
*B44C 1/22* (2006.01)
*C03C 15/00* (2006.01)
*C03C 25/68* (2006.01)
*C23F 1/00* (2006.01)

(52) U.S. Cl.
USPC ............................................. 216/49; 216/41

(58) Field of Classification Search
USPC ................................ 216/2, 41, 43, 49; 384/13
See application file for complete search history.

(56) References Cited

U.S. PATENT DOCUMENTS

| 5,462,362 | A | 10/1995 | Yuhta et al. |
| 2003/0128903 | A1 | 7/2003 | Yasuda et al. |
| 2005/0175837 | A1 | 8/2005 | Massler et al. |
| 2010/0024592 | A1 | 2/2010 | Maurin-Perrier et al. |

FOREIGN PATENT DOCUMENTS

| GB | 2 391 274 A | 2/2004 |
| JP | 2003-184883 A | 7/2003 |
| JP | 2004-330330 A | 11/2004 |
| JP | 2007-101979 A | 4/2007 |
| JP | 2007-270916 A | 10/2007 |
| JP | 2008-296502 A | 12/2008 |
| JP | 4332977 B2 | 7/2009 |
| JP | 2011-012767 A | 1/2011 |
| WO | 2008/047062 A2 | 4/2008 |

OTHER PUBLICATIONS

International Search Report for corresponding International Patent Application No. PCT/IB2011/002110 mailed Jan. 30, 2012.
International Preliminary Report on Patentability for corresponding International Patent Application No. PCT/IB2011/002110 mailed Aug. 24, 2012.

*Primary Examiner* — Roberts Culbert
(74) *Attorney, Agent, or Firm* — Sughrue Mion, PLLC (57) ABSTRACT

A slide member includes a substrate that is made of a metal material and has a sliding surface with a plurality of microdimples formed therein. Each of the microdimple has a circular opening, the microdimples are arranged in regular intervals in a hexagonal close-packed configuration, and the area ratio of the openings of all the microdimples to the entire sliding surface is in the range of 50 to 80%.

7 Claims, 6 Drawing Sheets

PITS FORMED BY ETCHING
(MICRODIMPLES)

FIG. 8

SLIDE MEMBER AND METHOD FOR THE PRODUCTION THEREOF

BACKGROUND OF THE INVENTION

1. Field of the Invention

The present invention relates to slide member that has a sliding surface in which microdimples are formed and a method for the production of the slide member. More specifically, the present invention relates to a slide member which has improved slidability under a lubricated condition and a method for the production of the slide member.

2. Description of the Related Art

Conventionally, slide members are used in various devices of a vehicle or the like such as engine and transmission. The use of slide members that have excellent abrasion resistance, low-friction properties and high anti-seizing properties not only ensures the safety of the vehicle but also leads to reduction of carbon dioxide emission from the vehicle for global environmental protection. Thus, various studies on tribology are under way to improve the sliding properties in a sliding condition by improving the surface textures, such as geometry and roughness, of the surfaces of slide members or providing a film that has excellent abrasion resistance and low friction properties on the surfaces of slide members.

As a technique to improve surface textures, a slide member which has a sliding surface in which dimple-like recessions (microdimples) are formed by sandblasting or shot peening and subsequent lapping or barrel polishing has been proposed. In addition, the area ratio of the openings of the microdimples to the entire sliding surface is 5 to 60% in the slide member (refer to Japanese Patent No. 4332977, for example).

As another technique, a slide member is proposed which has a plurality of regularly-arranged fine recesses (microdimples) that are formed by laser radiation in a sliding surface which is lubricated by lubricating oil when the slide member is in sliding motion. The microdimples have an opening area of 10 to 100 square and a maximum depth of 0.1 to 1 μm, and the ratio of total area of the openings of the microdimples to the entire sliding surface is 5 to 30% (refer to Japanese Patent Application Publication No. 2003-184883 (JP-A-2003-184883), for example).

According to the slide member that is described above, the friction coefficient of the slide member can be reduced and the abrasion resistance of the slide member can be improved because the slide member can hold lubricating oil that is supplied onto the sliding surface in the microdimples (recesses) when in sliding motion.

However, the slide member that is disclosed in Japanese Patent No. 4332977 has no regularity in the arrangement of the microdimples because the microdimples are formed by sandblasting or shot peening. Thus, even if the area ratio of the microdimples is increased, the density of the microdimples in the sliding surface may be varied from one location to another. As a result, because the locations where the lubricating oil are held in the sliding surface as a frictional interface are irregularly arranged, local seizure may occur.

In view of these points, it is considered preferable to provide a plurality of microdimples (fine recesses) regularly as in the slide member that is disclosed in JP-A-2003-184883. However, in the case of the slide member that is disclosed in JP-A-2003-184883, the total area ratio of the openings of the microdimples is as small as 5 to 30% and therefore the amount of lubricating oil that can be held in the frictional interface, or the sliding surface, may be too small to improve the anti-seizing properties. In addition, the microdimples are generally circular in shape but it is difficult to arrange the microdimples more densely from the viewpoint of production.

In the production method that is disclosed in JP-A-2003-184883, because the microdimples are formed by laser radiation, the laser emitter or the workpiece is moved by a predetermined distance at a time while the workpiece is processed. Thus, a multiplicity of microdimples cannot be formed simultaneously, and therefore the production of the slide member requires much time and cost.

SUMMARY OF THE INVENTION

The present invention has been made in view of the problems, and it is, therefore, an object of the present invention to provide a slide member which has improved anti-seizing properties when lubricated by lubricating oil, and a method for the production of a slide member by which the slide member can be produced at low cost and in less time.

The inventors conducted earnest studies to solve the problems, and, consequently, came up with a new finding that the anti-seizing properties can be significantly improved by arranging microdimples regularly and more densely than before in the sliding surface and adjusting the ratio of the microdimples within a prescribed range. In addition, the present inventors came up with another new finding that a sliding surface having such surface textures can be obtained in less time and lower cost than before by using masking and etching.

A first aspect of the present invention provides a slide member that includes a sliding surface which is made of a metal material and in which a plurality of microdimples are formed. Each of the microdimples has a circular opening, the microdimples are arranged at regular intervals in a hexagonal close-packed configuration, and the area ratio of the openings of all the microdimples to the entire sliding surface is in the range of 50 to 80%.

According to the first aspect, because the microdimples that are formed in the sliding surface are arranged at regular intervals in a hexagonal close-packed configuration, six microdimples are arranged in a closest packed configuration (that is, microdimples are arranged in a hexagonal configuration) around each of the microdimples, which are arranged at regular intervals. As a result, the slide member has a sliding surface in which a plurality of microdimples are formed regularly and more densely and can hold lubricating oil in the microdimples.

In addition, because the area ratio of the openings of all the microdimples to the entire sliding surface is in the range of 50 to 80%, the slide member can hold lubricating oil in the microdimples and allows an oil film to be formed stably on surfaces (raised surfaces) among the microdimples when in sliding motion. As a result, the sliding surface of the slide member can have improved anti-seizing properties.

When the area ratio above mentioned is less than 50%, lubricating oil may not be sufficiently supplied from the microdimples to the surfaces among the microdimples (raised surfaces as surfaces which are practically held in sliding contact with another member) when the slide member is in sliding motion, causing the sliding surface to seize. On the other hand, when the area ratio is greater than 80%, the area of the raised surfaces is so small that the contact pressure on the surfaces may be increased when the slide member is in sliding motion, causing the sliding surface to seize up.

In a more preferred aspect, the openings of the microdimples have a diameter in the range of 2 to 20 μm, and the microdimples have a maximum depth in the range of 0.2 to 2 μm. According to this aspect, when the above conditions are satisfied, the anti-seizing properties of the slide member can be further improved.

When the diameter of the openings is smaller than 2 μm, small openings make the distance between the microdimples so small and therefore, the raised surfaces are also so small that the microdimples cannot-hold a sufficient amount of lubricating oil to ensure a sufficient oil film pressure between sliding surfaces. When the diameter of the openings is greater than 20 μm, the openings are so large that the lubricating oil can easily escape from the microdimples in sliding motion and therefore a sufficient oil film pressure cannot again be obtained. In addition, when the maximum depth of the microdimples is less than 0.2 μm, the microdimples are too shallow to hold a sufficient amount of lubricating oil in sliding motion. On the other hand, it is difficult to form microdimples that has an opening diameter in the above range and also has a maximum depth of greater than 2 μm.

Here, the term "microdimples" that is used in the first aspect means dimple-like fine recesses (depressions) that have an opening with a diameter in the range of 0.1 μm to a few hundred μm. The term "the entire sliding surface" means the sliding surface including the openings of the microdimples. Thus, the area ratio can be expressed differently as follows: area ratio=(total area of the openings of all the microdimples)/(total area of the openings of all the microdimples+area of other surfaces that are practically held in sliding contact.)

Examples of the method for forming the microdimples includes, but not specifically limited to, mechanical methods, chemical methods and method using heat such as laser. However, in a more preferred aspect, the microdimples are microdimples that are formed by masking the sliding surface of the metal material with a resin film that has circular voids equally spaced in a surface thereof which are arranged in a hexagonal close-packed configuration, and contacting an etchant with the sliding surface through the voids.

Because the microdimples that are formed by the above method are microdimples that are formed by etching using a resin film with a plurality of voids as described above as a masking material, the circumferential edges of the opening are not raised unlike the microdimples that are formed by laser processing that are shown in JP-A-2003-184883 that is described above. Thus, the sliding surface of the slide member in this aspect of the present invention is smooth.

In addition, the method for the production of the resin film is not specifically limited as long as a plurality of voids that are arranged as described above can be formed by machining or laser processing. However, in a more preferred aspect, the resin film is a film that is fabricated using condensation of water and vaporization of water droplets formed by the condensation.

Because the resin film that is formed by the method is a resin film that has a surface in which circular voids are arranged at regular intervals in a hexagonal close-packed configuration, it can be used as a more suitable masking material. In addition, because the size of water droplets that are formed by condensation of water can be easily varied by changing the humidity conditions and so on, the diameter of the voids can be adjusted to a desired diameter. Therefore, the diameter of the openings of the microdimples can be adjusted.

In a more preferred aspect, the resin film is a resin film that is made of a thermoplastic resin. In this aspect, because the resin film is made of a thermoplastic resin, the thermoplastic resin can be softened and stretched by applying heat before the microdimples are formed by contacting an etchant with the sliding surface. Thus, the area ratio of the openings of all the voids to the entire surface of the resin film can be adjusted by reducing the diameter of the voids in the resin film (that is, reducing the size of the voids). Some resin materials are less likely to be softened and stretched even if heated. In this case, when the bonding strength around the openings of the voids is reduced by adjusting the amount of the additives or heating temperature and time during masking, the circumferential edges of the openings of the voids are also removed by etching. As a result, dimples that have a diameter larger than that of the openings of the voids in the resin film can be formed. In other words, the area ratio of the dimples can be adjusted to be greater than the area ratio of the openings of the voids in the resin film by this method.

As described above, the diameter of the openings of the microdimples can be adjusted by controlling the diameter of water droplets that are formed in the resin film, the decrease (or rate of decrease) in the diameter of the openings in the resin film during the heating of the resin film, and the bonding strength around the resin film openings.

A method for the production of a slide member according to a second aspect of the present invention includes at least the steps of: fabricating a resin film that has a surface in which circular voids are arranged at regular intervals in a hexagonal close-packed configuration; masking a sliding surface that is made of a metal material with the resin film by bonding the surface of the resin film to the sliding surface; and forming microdimples by contacting an etchant with the masked sliding surface through the voids.

According to the second aspect, because a resin film with voids is used as a masking material for use in masking the sliding surface and etching of the sliding surface that is made of a metal material is carried out by contacting an etching solution with parts of the sliding surface that are exposed through the voids, a plurality of micro dimples can be easily and simultaneously formed at low cost without raising circumferential edges of the openings. In addition, the formed microdimples have a circular opening and are arrange at regular intervals in a hexagonal close-packed configuration.

In a more preferred aspect, the resin film is made of a thermoplastic resin, and the area ratio of openings of all the microdimples to the entire sliding surface is adjusted by adjusting the area ratio of the openings of all the voids to the entire surface of the resin film by stretching the resin film by applying heat before the step of forming the microdimples.

In addition, the resin film is made of a thermoplastic resin, and the area ratio of the microdimples can be adjusted to a desired area ratio by adjusting the diameter of the microdimples by stretching the thermoplastic resin of the resin film by heating the resin film to reduce the diameter of the voids before the step of forming the microdimples.

In another preferred aspect, in the step of masking the sliding surface, the area ratio of the openings of all the microdimples to the entire sliding surface is adjusted by adjusting the area of the sliding surface to be contacted with the etchant in the step of forming the microdimples by adjusting the bonding state between circumferential edges of the openings of the voids and the sliding surface.

In this aspect, in the step of masking the sliding surface, the area ratio of the microdimples can be adjusted to a desired area ratio by adjusting the area that is masked during etching by reducing the bonding strength around the openings of the voids to adjust the diameter of the openings of the microdimples.

In a more preferred aspect, the area ratio of the openings of all the microdimples is adjusted so that the area ratio of the openings of the microdimples to the entire sliding surface can be in the range of 50 to 80%. In this aspect, because microdimples can be formed such that the area ratio the openings of all the microdimples to the entire sliding surface is in the range of 50 to 80%, the slide member can hold lubricating oil in the microdimples and allows an oil film to be formed stably on surfaces (raised surface) among the microdimples when the slide member is in sliding motion.

The resin film is not specifically limited as long as the void as described above can be formed. In a more preferred aspect, in the step of fabricating the resin film, the resin film is fabricated using condensation of water and vaporization of water droplets that are formed by the condensation.

In this aspect, a resin film that has a surface in which circular voids are arranged at regular intervals in a hexagonal close-packed configuration can be fabricated easily. In addition, because the size of water droplets that are formed by condensation of water can be easily varied by changing the humidity conditions and so on, the diameter of the voids can be adjusted to a desired diameter. Therefore, the diameter of the openings of the microdimples can be easily adjusted.

The slide member according to the first aspect of the present invention has improved anti-seizing properties when lubricated with lubricating oil. In addition, the production method according to the second aspect of the present invention enables a slide member which has improved anti-seizing properties when lubricated with lubricating oil to be produced at low cost and short time.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIGS. 1A to 1F are schematic cross-sectional views that illustrate a method for the production of a slide member according to this embodiment, wherein

FIGS. 2A and 2B are a view that illustrates the method for the fabrication of the resin film that is shown in FIG. 1A in more detail, wherein

FIGS. 3A and 3B are a view that illustrates the arrangement of microdimples that are formed in a sliding surface, wherein

DETAILED DESCRIPTION OF EMBODIMENTS

Description is hereinafter made of an embodiment in which a slide member according to the present invention can be suitably produced with reference to the drawings.

Figure 1A:
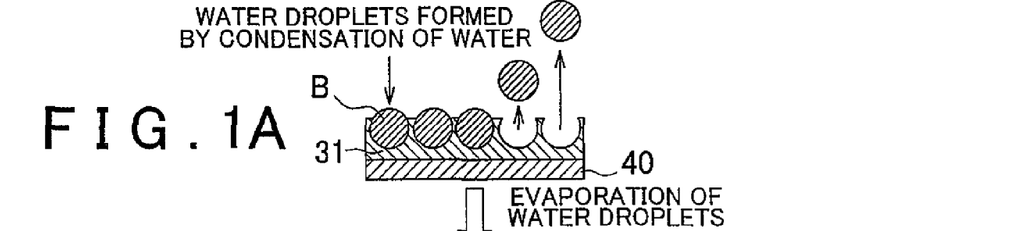
FIG. 1A is a view that illustrates the step of fabricating a resin film using water droplets that are formed by condensation of water and vaporization of the water droplets.
Figure 1B:
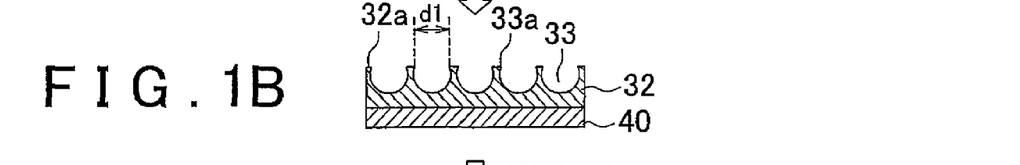
FIG. 1B is a view that illustrates the resin film that is fabricated in the step that is shown in FIG. 1A.
Figure 1C:
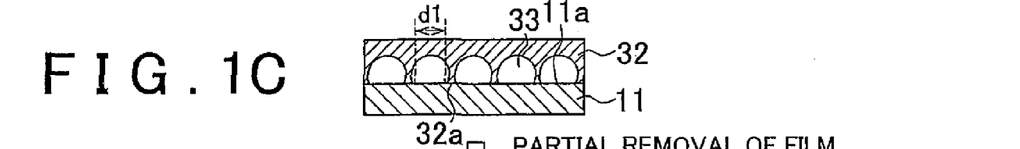
FIG. 1C is a view that illustrates the step of masking a sliding surface with the resin film that is shown in FIG. 1B.
Figure 1D:
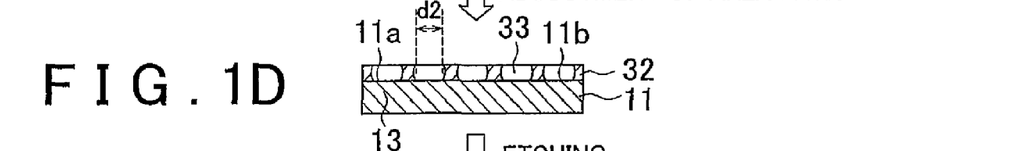
FIG. 1D is a view that illustrates partial removal of the resin film and adjustment of the area ratio of the resin film.
Figure 1E:
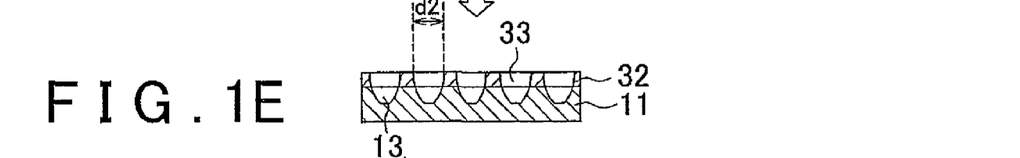
FIG. 1E is a view that illustrates the step of forming microdimples by etching the masked sliding surface that is shown in FIG. 1D.
Figure 1F:
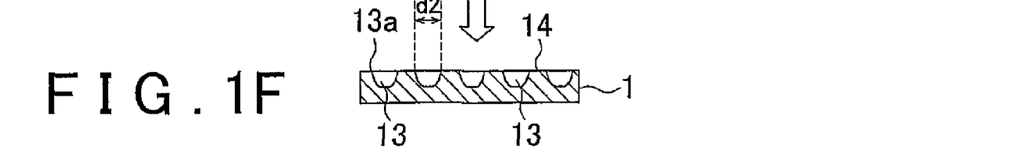
FIG. 1F is a view that illustrates the slide member after the removal of the resin film that is shown in FIG. 1E.

FIG. 1A to FIG. 1F are schematic cross-sectional views that illustrate a method for the production of a slide member according to this embodiment. Specifically, FIG. 1A is a view that illustrates the step of fabricating a resin film using water droplets that are formed by condensation of water and vaporization of the water droplets, FIG. 1B is a view that illustrates the resin film that is fabricated in the step that is shown in FIG. 1A, FIG. 1C is a view that illustrates the step of masking a sliding surface with the resin film that is shown in FIG. 1B, FIG. 1D is a view that illustrates the step of partially removing the resin film and adjusting the area ratio of the resin film, FIG. 1E is a view that illustrates the step of forming microdimples by etching the masked sliding surface that is shown in FIG. 1D, and FIG. 1F is a view that illustrates the slide member after the removal of the resin film that is shown in FIG. 1E.

In this embodiment, microdimples are formed in a sliding surface of a substrate that is made of a metal material by etching using a resin film, as shown below. Here, the metal material is not specifically limited as long as the sliding surface can be partially etched with an etchant, which is described later, and examples of the metal material include iron, aluminum, copper and alloys thereof.

Figure 2A:
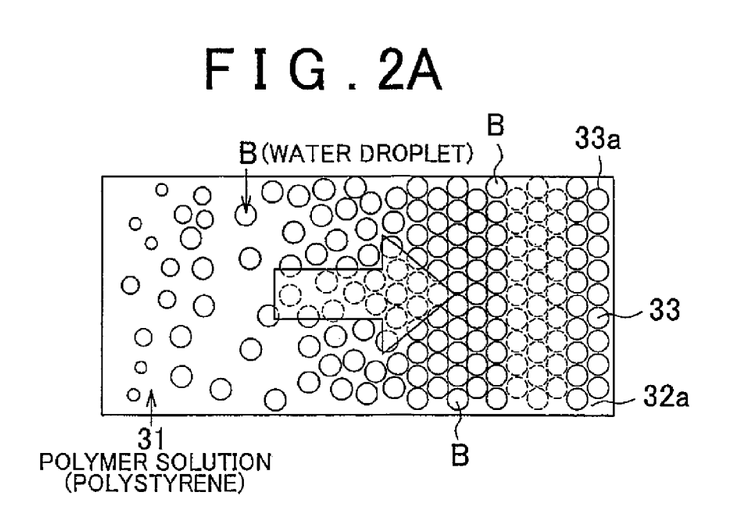
FIG. 2A is a schematic top plan view and FIG. 2B is a cross-sectional view.
Figure 2B:
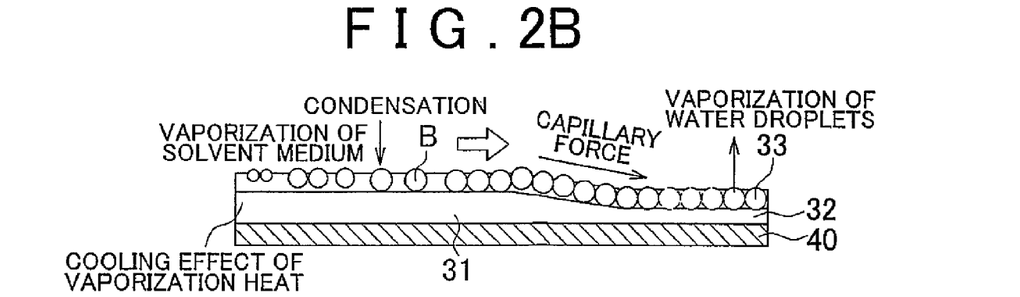

Referring first to FIG. 1A, FIG. 1B, FIG. 2A and FIG. 2B, the step of fabricating the resin film is described. FIG. 2A and FIG. 2B are views that illustrate in more detail the resin film fabrication method that is shown in FIG. 1A. Specifically, FIG. 1A is a schematic top plan view, and FIG. 1B is a cross-sectional view.

As shown in FIG. 1A, FIG. 2A and FIG. 2B, a polymer solution (hydrophobic organic solution) 31 that is obtained by mixing an amphiphilic compound and a hydrophobic organic solvent with a polymeric resin material such as polystyrene is applied to coat a substrate 40 of, for example, glass. Next, high-humidity air is blown onto the coated surface of substrate 40, and water (moisture) is condensed using the vaporization heat of the organic solvent (solvent medium) to form a plurality (an infinite number) of water droplets (fine water droplets) B in the polymer solution 31.

With the progress of vaporization of the solvent medium in the polymer solution 31, the thermoplastic resin in the polymer solution turns into a film and the condensed water droplets B are arranged at regular intervals in a hexagonal close-packed configuration by capillary force (capillarity). Then, the water droplets B are vaporized (evaporated) by, for example, applying heat. As a result, as shown in FIG. 1B, FIG. 2A and FIG. 2B, a honeycomb porous resin film (self-assembled honeycomb structure film) 32 that has a surface 32a in which circular voids 33 (openings 33a) are arranged at regular intervals in a hexagonal close-packed configuration is formed on the substrate 40.

Here, the diameter of the fine water droplets can be controlled by varying the humidity of the air to be blown and the air-blowing time (humidifying time). The diameter d1 of the openings 33a of the voids 33 that are formed in the surface 32a can be therefore adjusted in the range of 1 μm to 25 μm, and therefore, the diameter of the openings of the microdimples in the sliding surface, which is described later, can be adjusted. For example, when the humidity is increased and the humidifying time is prolonged, the amount of condensed water increases, resulting in increased diameter of the fine water droplets. The use of such a resin film allows formation of larger microdimples in a surface of the slide member. In addition, because the water droplets (fine water droplets) B are arranged in a hexagonal close-packed configuration, the area ratio of the openings 33a of all the voids 33 to the entire surface of the resin film 32 is generally constant regardless of the diameter d1 of the openings 33a. For example, in the case of polystyrene, the area ratio is approximately 50%. While the area ratio varies depending on the resin material for the resin film, the area ratio is generally constant regardless of the diameter when the same resin is used.

The polymeric resin material is not specifically limited as long as it is soluble in a hydrophobic organic solvent, but it is preferably insoluble or poorly soluble in water. Examples of the polymeric resin material include polyethylene, polypropylene, polybutadiene, polystyrene, polymethacrylamide, polyvinyl chloride, polyvinylidene chloride, polyvinyl ether, polycaprolactone, polyether, polyester, polyamide, polyimide etc. Among the polymeric resin materials, the choice of a thermoplastic resin which can be easily softened and stretched when heated, such as polyethylene and polypropylene, is preferred because the diameter of the openings of the voids 33 can be reduced to adjust the area ratio thereof by heating the resin film 32 as described later.

The amphiphilic compound is not specifically limited, and Cap, for example, can be used. Other suitable examples include sodium dodecylbenzenesulfonate and di-2-sodium ethylhexyl sulfosuccinate.

In addition, the hydrophobic organic solvent is not specifically limited as long as it is a hydrophobic organic solvent which is liquid at ordinary temperature. Examples include halogen-based organic solvents such as chloroform, methylene chloride and carbon tetrachloride, aromatic hydrocarbons such as benzene, toluene and xylene, ester-based solvents, ketone-based solvents, amide-based solvent media and ether-based solvent media. In this way, spherical fine water droplets with the same radius of curvature can be formed in a polymer solution that is prepared by casting a hydrophobic organic solution.

It should be noted that the resin film fabrication method is a resin film fabrication method using self-assembly, and a fabrication method using a phenomenon in which water droplets with the same diameter which are arranged in a hexagonal close-packed configuration align at regular intervals (production method that is disclosed to the public in Japanese Patent Application Publication No. 2001-157574 (JP-A-2001-157574) and Japanese Patent Application Publication No. 2008-296502 (JP-A-2008-296502), for example).

Next, as shown in FIG. 1C, the fabricated resin film 32 is removed from the substrate 40, and the surface 32a of the resin film 32, in which the voids 33 have been formed, is bonded to a sliding surface 11a of a substrate 11 which is made of a metal material to mask the sliding surface 11a with the resin film 32. One example of the bonding method is to apply an adhesive such as an aqueous polyvinyl alcohol (PVA) solution to the surface 32a of the resin film 32 by, for example, spin coating and bond the surface 32a to the sliding surface 11a of the substrate 11.

Next, as shown in FIG. 1D, an upper half layer of the masked resin film 32 is removed to expose portions 11b of the sliding surface 11a corresponding to the openings 33a of the voids 33. The resin film 32 is stretched by heating the resin film 32 to reduce the diameter d1 of the openings 33a of the voids 33. At this time, because the adhesive that is present between the surface 32a of the resin film 32 and the sliding surface 11a is also stretched when the resin film 32 is stretched, the bonding state around the openings 33a is hardly changed. As a result, microdimples that have an opening with a diameter which is generally equal to a reduced diameter d2 can be formed.

By this adjustment, the area ratio of the openings 33a of all the voids 33 to the entire surface 11a of the resin film 32 is adjusted to be in the range of 50 to 80%. The reduced diameter d2 of the openings 33a corresponds to the diameter of the openings of microdimples 13, which are described later, and the area of all the exposed portions 11b corresponds to the total area of the openings of all the microdimples, which are also described later.

On the other hand, when the area ratio of the microdimples is desired to be increased, the bonding strength around the openings 33a of the voids 33 is reduced (the bonding state between circumferential edges of the openings of the voids and the sliding surface is adjusted) by adjusting the amount of adhesive that is used to bond the resin film 32 and the heating temperature and time so that the circumferential edges can be also removed during etching (the area of the sliding surface to be contacted with the etchant in the step of forming the microdimples 13 can be adjusted). In this way, the diameter of openings 13a of the microdimples 13 can be larger than the diameter of the openings 33a of the voids 33 of the resin film 32. In other words, this method enables the area ratio of the microdimples 13 to be adjusted to be larger than the area ratio of the openings 33a of the voids 33 of the resin film 32.

Next, as show in FIG. 1E, an etching solution is brought into contact with the exposed portions 11b of the sliding surface 11a that are exposed through the voids 33. In this way, etching of the masked sliding surface 11a can be carried out to partially remove the substrate 11 chemically to form the microdimples 13 that have an opening with a diameter of d2. In addition, when the bonding strength around the openings 33a of the voids 33 has been reduced as described above, the circumferential edges of the openings 33a are also removed during the etching.

The etching solution is not specifically limited as long as it can chemically dissolve a surface of the metal material that is described above, and suitable examples include aqueous solutions of strong acids such as hydrochloric acid, nitric acid and sulfuric acid. Finally; when the resin film 32 is removed from the substrate 11 as a slide member as shown in FIG. 1F, a slide member 1 is obtained.

The diameter d2 of the openings of the microdimples is in the range of 2 to 20 μm. The diameter d2 can be adjusted in this range by controlling the humidity condition that is described above to adjust the diameter of the voids in the surface of the resin film in view of the decrease in the diameter of the openings 33a of the resin film 32 during heating and the decrease in the bonding strength around the openings 33a of the voids 33 including non-bonded portions in the masking step (bonding step). In addition, the maximum depth of the microdimples is in the range of 0.2 to 2 μm. The maximum depth can be adjusted in this range by repeating the above etching process.

The slide member that is obtained in this way has a sliding surface in which a plurality of microdimples are formed regularly and more densely and can hold lubricating oil in the microdimples.

Figure 3A:
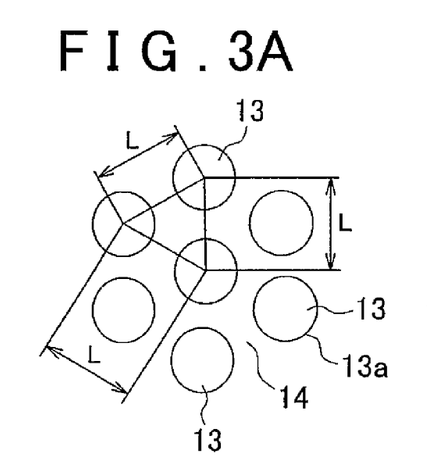
FIG. 3A is a view that illustrates the arrangement of microdimples in this embodiment.
Figure 3B:
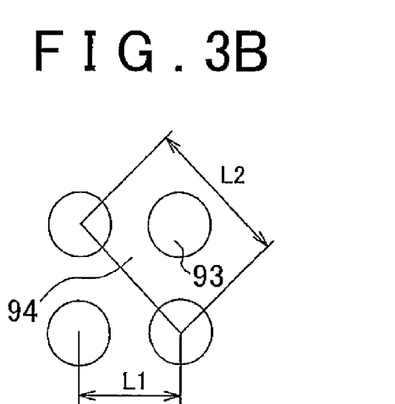
FIG. 3B is a view that illustrates an example of a conventional arrangement of microdimples.

As shown in FIG. 3A each of the microdimples 13 formed has a circular opening 13a and the microdimples 13 are arranged at regular interval in a hexagonal close-packed configuration. It is considered that when microdimples 93 are arranged as in a conventional slide member (JP-A-2003-184883, which is described above) as shown, in FIG. 3B, the lubricating oil in the microdimples 93 is less likely to be supplied to the surface 94 that is shown at the center of the drawing (raised surface as a sliding contact portion) when the slide member is in a sliding motion because the distance L2 between two diagonally located microdimples is greater than the distance L1 between four adjacent microdimples 93. However, as shown in FIG. 3A all the microdimples 13 of this embodiment have the same distance L to each other because the microdimples 13 are arranged in a hexagonal close-packed configuration. Thus, lubricating oil can be stably supplied to the surfaces 14 that are formed among the microdimples 13 (raised surfaces as surfaces which are practically held in sliding contact with another member).

In addition, because the area ratio of the openings 13a of all the microdimples 13 to the entire sliding surface 11a is in the range of 50 to 80%, lubricating oil can be held in the microdimples 13 and an oil film which improves the anti-seizing properties of the sliding surface 11a of the slide member 1 is stably formed on the surfaces 14 among the microdimples 13 when the slide member is in sliding motion. The area of the entire sliding surface is the sum of the total area of the openings 13a of all the microdimples 13 and the total area of the raised surfaces 14, and the area ratio is a value that is obtained by dividing the total area of the openings 13a of all the microdimples 13 by the area of the entire sliding surface.

When the area ratio is less than 50%, lubricating oil may not be sufficiently supplied from the microdimples to the surfaces 14 formed among the microdimples 13 (raised surfaces as surfaces which are practically held in sliding contact with another member) when the slide member is in sliding motion, causing the sliding surface to seize up. When the area ratio is greater than 80%, the area of the raised surfaces 14 is so small that the contact pressure applied on the surfaces 14 may be increased when the slide member is in sliding motion, causing the raised surfaces 14 to seize up.

The following examples further describe the present invention. The following examples were carried out in line with the above embodiment but are not intended to limit the present invention.

Example 1

1) Fabrication of Resin Film (Honeycomb Porous Film)

Figure 4A:
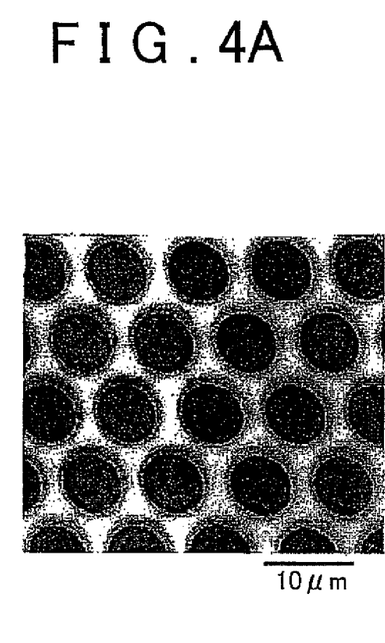
FIG. 4A is a photograph of the upper surface of a resin film (honeycomb porous film) of Example 1 which was observed under a microscope.
Figure 4B:
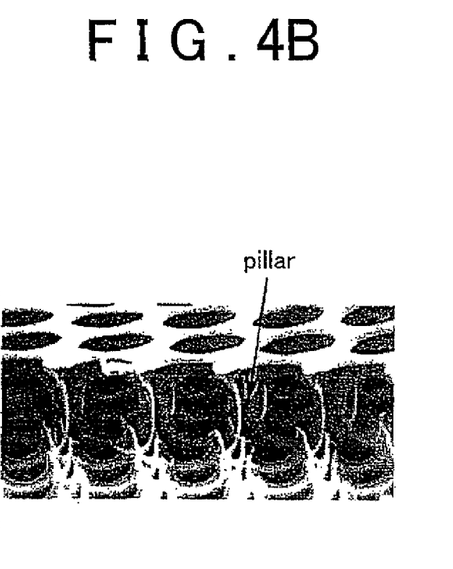
FIG. 4B is a photograph of a cross-section of the honeycomb porous film which was observed under a microscope.

First, a $CHCl_3$ solution (5 g/L) was cast into a mixture (PS:Cap 10:1) of a polystyrene (PS, Mw=280000, Aldrich, Chart 1) and 10% by mass of an amphiphilic compound (Cap) in a glass Schale with a diameter of 9 cm. High-humidity air (relative humidity: approximately 70%) was blown onto the mixture to condensate the water in order to form fine water droplets at regular intervals in a hexagonal close-packed configuration. Then, the spherical fine water droplets were evaporated to prepare a self-assembled resin film (honeycomb porous film) that had voids with an opening of 8 μm in diameter which were arranged at regular intervals in a hexagonal close-packed configuration. FIG. 4A is a photograph of the upper surface of a resin film (honeycomb porous film) of Example 1 which was observed under a microscope, and FIG. 4B is a photograph of a cross-section of the honeycomb porous film which was observed under a microscope.

2) Masking

The resin film obtained in step 1) was spin coated with an aqueous PVA (polyvinyl alcohol). The spin-coated resin film was turned over and the surface having voids was bonded to a flat test piece (dimensions: 30×30×5 mm, material: carbon steel (JIS: S55 quenched), surface roughness Ra: 0.02 μm). Then, a layer of the resin film without voids was removed (refer to FIG. 1D), and the flat test piece was dried at 80° C. for 10 minutes. After that, the residual PVA on the surface was washed off with a solvent medium, and the flat test piece was heated (annealed) at 200° C. for three hours to adjust the diameter of the openings of the voids and the area ratio of the voids to the entire surface to 8 μm and 50%, respectively. The polystyrene that was used here is a material which is hardly softened when heated, and no change was observed in the diameter of the openings of the voids before and after the annealing.

3) Etching

A mixed solution of 0.6 ml of nitric acid and 9.4 ml of ethanol was stirred with a stirrer for 30 second, and the masked flat test piece was immersed in the mixed solution for five seconds. The flat test piece was then washed with ethanol and dried with a drier. The immersion, washing and drying were repeated until the micro dimples had a maximum depth of 0.3 μm. Finally, the honeycomb structure film was removed from the flat test piece, and the flat test piece was washed with ethanol. In this way, a flat test piece corresponding to a slide member was prepared. The maximum depth of the microdimples was measured with a contact-type surface roughness meter.

Figure 5:
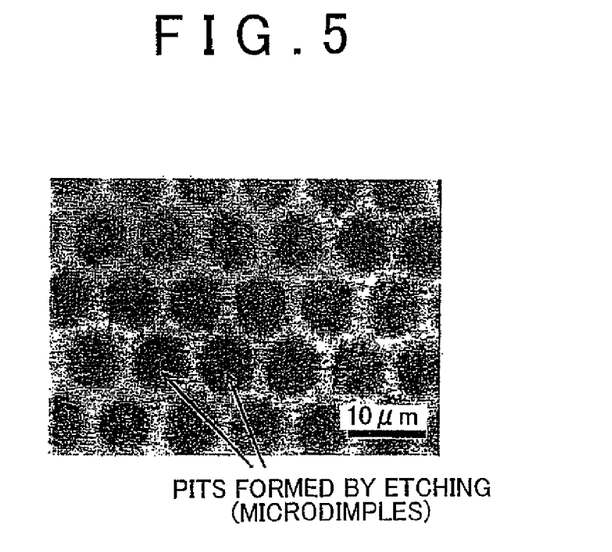
FIG. 5 is a photograph of the sliding surface of a slide member of Example 1 which was observed under a microscope.

FIG. 5 is a photograph of the sliding surface of the slide member of Example 1 that was observed under an optical microscope. In this slide member, the area ratio of the openings of the microdimples to the entire sliding surface of the slide member was 50%. The diameter of the openings of the microdimples was 8 μm. The area ratio was obtained by distinguishing the regions corresponding to the microdimples and the other regions on the photograph (image) that is shown in FIG. 5 by binarization and dividing the area of the regions corresponding to the microdimples by the area of the entire image. The diameter of the openings of the microdimples was measured on the image.

Figure 6:
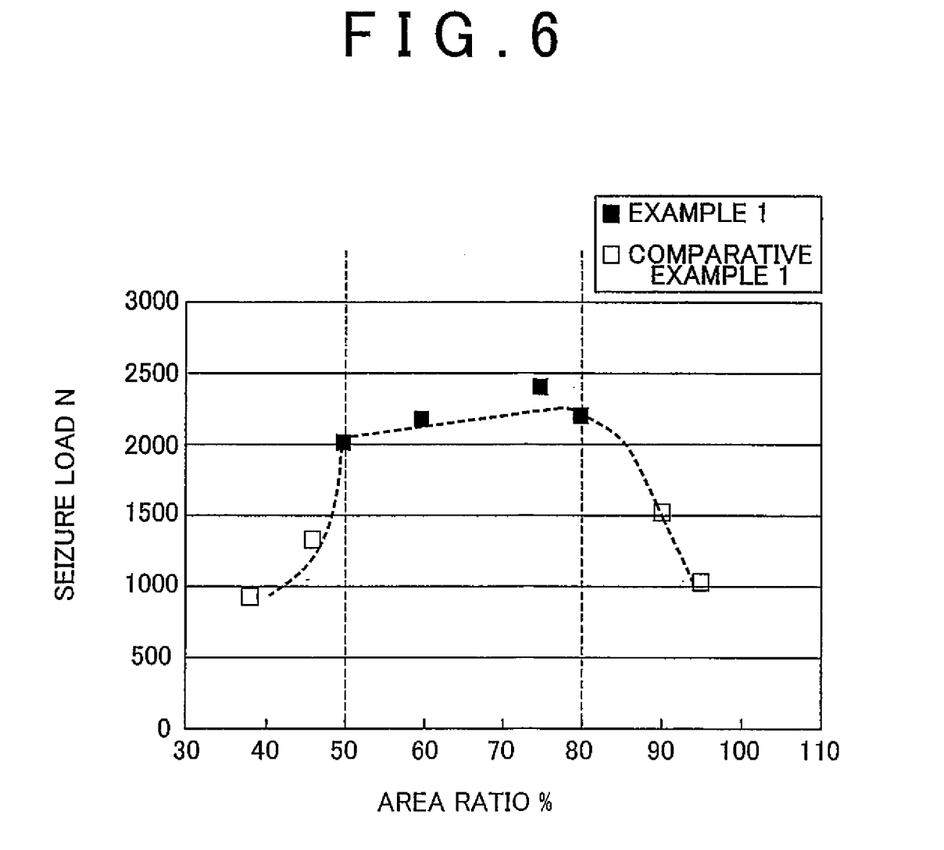
FIG. 6 is a graph that shows the results of seizure tests on slide members of Example 1 and Comparative Example 1.

In addition, as test pieces of Example 1, flat test pieces that had microdimples with an opening diameter (dimple diameter) in the range of 8 to 12 μm so that the area ratio could be in the range of be 50 to 80% as shown in FIG. 6 and with a maximum depth of 0.3 μm were prepared. The area ratio was varied by adjusting the substantial bonding area (the area which would be prevented from being etched by the masking) by adjusting the amount of the PVA and the annealing temperature and time to reduce the bonding strength around the openings of the voids in the bonding step for masking because the material of the resin film that was used this time was a polystyrene which is unlikely to be softened and stretched even if heated.

Comparative Example 1

Flat test pieces were prepared in generally the same manner as in Example 1. The differences from Example 1 were that the dimple diameter, the amount of PVA, and the annealing temperature and time were adjusted so that the area ratio could exceed 80% as shown in FIG. 6, and that flat test pieces with an area ratio of less than 50% were prepared using laser radiation and subsequent lapping.

<Seizure Test>

A seizure test was conducted on the flat test pieces of Example 1 and Comparative Example 1. Specifically, a cylindrical test piece (dimensions: outside diameter φ25.6, inside diameter φ20, height 15 mm, material: carbon steel (S50 quenched), surface roughness Ra: 0.02 μm) was prepared. An end face of the cylindrical test piece was pressed against the sliding surface of the flat test piece, and a preliminary testing was carried out at a load of 100 N for ten minutes by rotating the cylindrical test piece at at a rotational speed of 500 rpm. Then, the load was increased by 100 N at a time every two minutes and the test was finished when seizure occurred. It was determined that seizure occurred when the friction coefficient exceeded 0.3 during the test. A commercially available engine oil 0W20 was used as the lubricating oil, and the test was conducted at an oil bath temperature of 80° C. The results are shown in FIG. 6.

[Result 1]

As shown in FIG. 6, the flat test pieces of Example 1, which had an area ratio of 50 to 80%, had a seizure load of 2000 N or higher, which indicates that the flat test pieces of Example 1 had good anti-seizing properties compared to those of Comparative Example 1. A possible reason for this is that when the area ratio is less than 50%, lubricating oil may not be sufficiently supplied from the microdimples to the surfaces among the microdimples (raised surfaces as surfaces which are practically held in sliding contact with another member) when the flat test piece is in sliding motion, causing the sliding surface to seize. It is believed, on the other hand, that when the area ratio is greater than 80%, the area of the raised surfaces is so small that the contact pressure on the surfaces may be increased, causing the sliding surface to seize up.

Example 2

Figure 7:
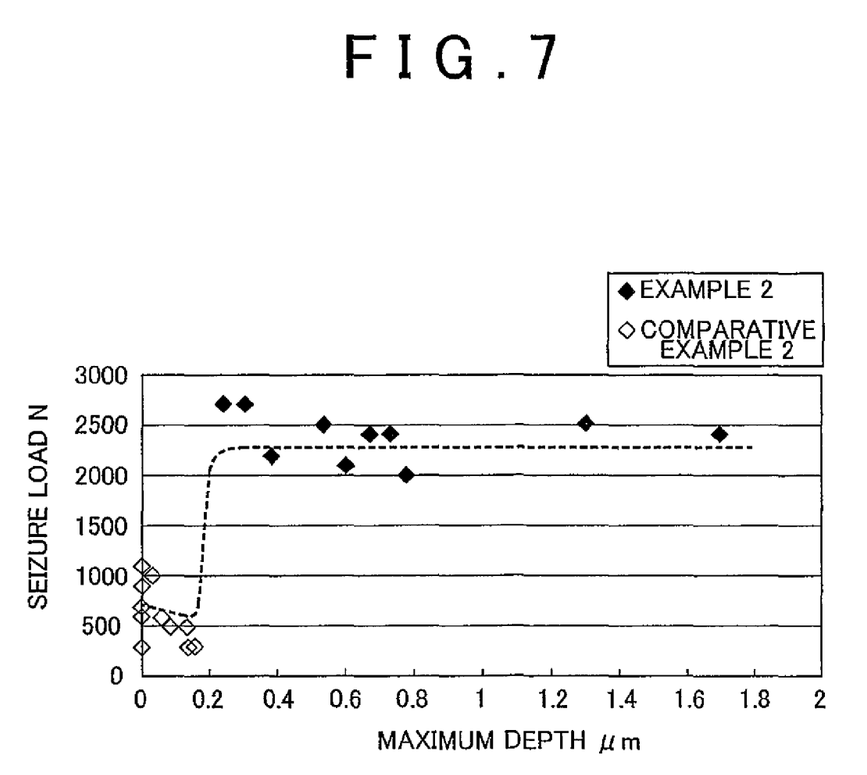
FIG. 7 is a graph that shows the results of seizure tests on slide members of Example 2 and Comparative Example 2.

Flat test pieces were prepared in generally the same manner as in Example 1. The difference from Example 1 was that a plurality of flat test pieces that had microdimples with an opening diameter (dimple diameter) of 8 μm and an area ratio of 65% and with different maximum depths in the range of not smaller than 0.2 μM as shown in FIG. 7 that were adjusted by repeating the etching process were prepared. A seizure test was conducted in the same manner as in Example 1. The results are shown in FIG. 7.

Comparative Example 2

Flat test pieces were prepared in generally the same manner as in Example 2. The difference from Example 2 was that a plurality of flat test pieces that had microdimples with different maximum depths in the range of smaller than 0.2 μm were prepared as shown in FIG. 7 by repeating the etching process. A seizure test was conducted in the same manner as in Example 1. The results are shown in FIG. 7.

Example 3

Flat test pieces were prepared in generally the same manner as in Example 1. The differences from Example 1 were that the diameter of the openings of the microdimples (dimple diameter) and the area ratio were adjusted to 8 μm and 65%, respectively, and that the maximum depth of the microdimples was adjusted to 2 μm by repeating the etching process.

Comparative Example 3

Flat test pieces were prepared in generally the same manner as in Example 3. The differences from Example 3 were that the diameter of the openings of the microdimples (dimple diameter) and the area ratio were adjusted to 8 μm and 65%, respectively, and that the maximum depth of the microdimples was adjusted to 2.2 μm (greater than 2 μm) by repeating the etching process.

[Result 2]

As shown in FIG. 7, the flat test pieces of Example 2, which had microdimples with a maximum depth of 0.2 μm or greater, had a seizure load which is approximately four times those of the flat test pieces of Comparative Example 2. It is considered that when the maximum depth of the microdimples is less than 0.2 μm as in Comparative Example 2, the microdimples are too shallow to hold a sufficient amount of lubricating oil when the flat test piece is in sliding motion. A flat test piece that had microdimples with a maximum depth of 0.2 μm was able to be prepared in Example 3, whereas even the circumferential edges (rims) of the microdimples were removed after the microdimples exceeded 2 μm in depth when etching was repeated in Comparative Example 3. These results indicates that the suitable range of the maximum depth of the microdimples is 0.2 to 2 μm.

Example 4

Figure 8:
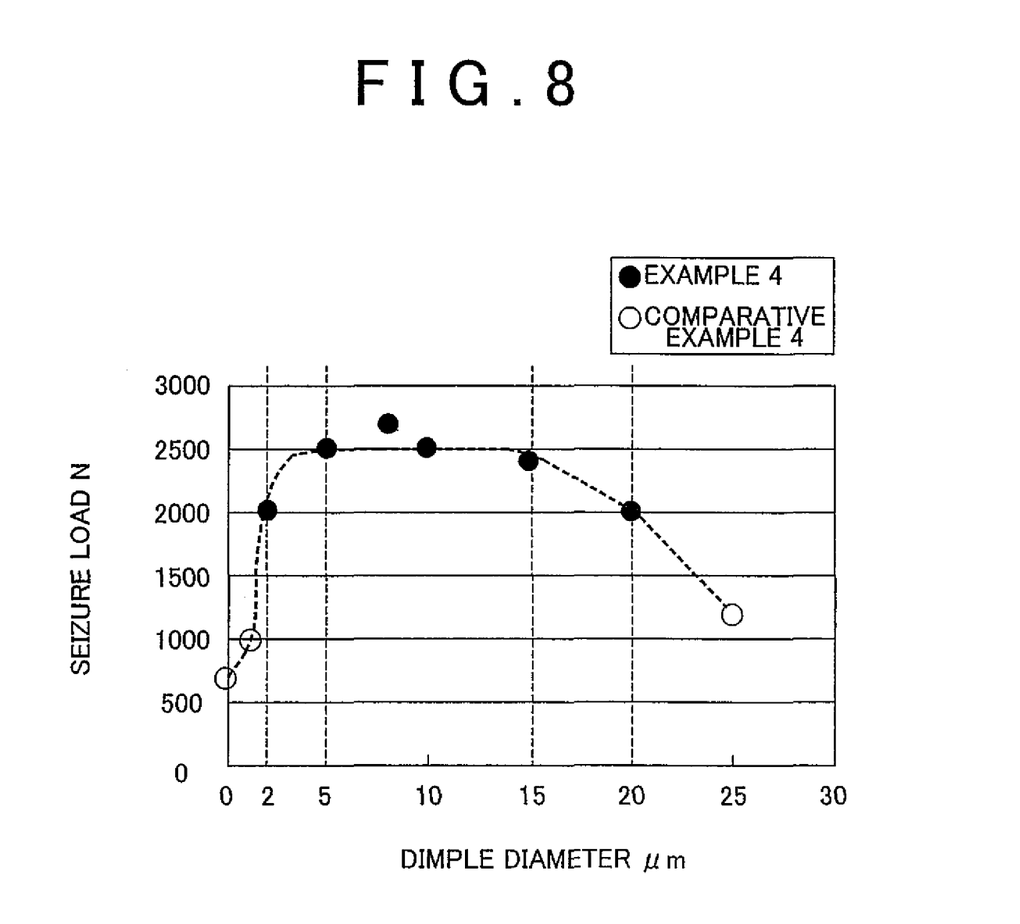
FIG. 8 is a graph that shows the results of seizure tests on slide members of Example 4 and Comparative Example 4.

Flat test pieces were prepared in generally the same manner as in Example 1. The difference from Example 1 was that a plurality of flat test pieces that had microdimples with a maximum depth of 0.3 μm and an area ratio of 65% and with different opening diameters in the range of 2 to 20 μm as shown in FIG. 8 were prepared. When a honeycomb structure film is fabricated by blowing high-humidity air onto a CHCl$_3$ solution of a mixture of polystyrene and an amphiphilic compound (Cap), the dimple diameter can be adjusted by adjusting the size of the water droplets by adjusting the humidity of the air to be blown and the blowing time (humidifying time). Using this, the diameter of the openings of the microdimples was varied. A seizure test was conducted in the same manner as in Example 1. The results are shown in FIG. 8.

Comparative Example 4

Flat test pieces were prepared in generally the same manner as in Example 4. The difference from Example 4 was that a plurality of flat test pieces that had microdimples with an opening diameter of less than 2 μm or greater than 20 μm were prepared. A seizure test was conducted in the same manner as in Example 1. The results are shown in FIG. 8.

[Result 3]

As shown in FIG. 8, the flat test pieces of Example 4, which had microdimples with an opening diameter of 2 to 20 μm, had a seizure load of 2000 N or higher and, of these, the flat test pieces which had microdimples with an opening diameter of 5 to 15 μm had a seizure load of 2500 N or higher. This indicates that the flat test pieces of Example 4 have better anti-seizing properties than those of Comparative Example 4. A possible reason for this is that because the openings are small and, therefore, the distance between the microdimples is too small when the diameter of the openings is smaller than 2 μm, the raised surfaces are so small that the microdimples cannot hold a sufficient amount of lubricating oil to ensure a sufficient oil film pressure between sliding surfaces. It is believed, on the other hand, that when the diameter of the openings is greater than 20 μm, the openings are so large that the lubricating oil can easily escape from the microdimples when the test piece is in sliding motion and therefore a sufficient oil film pressure cannot be again obtained.

While one embodiment of the prevent invention has been descried with reference to the accompanying drawings, it should be noted that the specific configuration is not limited to the embodiment and any change in design which does not depart from the gist of the present invention is included in the present invention.

The invention claimed is:

1. A method for the production of a slide member, comprising the steps of:
    fabricating a resin film that has a surface in which voids that have a circular opening are arranged at regular intervals in a hexagonal close-packed configuration;
    masking a sliding surface that is made of a metal material with the resin film by bonding the surface of the fabricated resin film to the sliding surface; and
    forming microdimples by bringing an etchant into contact with the sliding surface masked through the voids;
    wherein the resin film is made of a thermoplastic resin, and an area ratio of openings of all the microdimples to the entire sliding surface is adjusted by adjusting the area ratio of the openings of all the voids to the entire surface of the resin film by stretching the resin film by applying heat to the resin film before the step of forming the microdimples.

2. The production method according to claim 1,
    wherein the area ratio of the openings of all the microdimples is adjusted so that the area ratio of the openings of the microdimples to the entire sliding surface can be in the range of 50 to 80%.

3. The production method according to claim 1,
    wherein, in the step of fabricating the resin film, the resin film is fabricated using condensation of water and vaporization of water droplets that are formed by the condensation.

4. The production method according to claim 3,
    wherein the step for fabricating the resin film includes,
    applying a polymer solution that is obtained by mixing an amphiphilic compound and a hydrophobic organic solvent with a polymeric resin material, to coat a substrate;
    blowing a humidity air onto the polymer solution coating the substrate, and condensing water using a vaporization heat of the organic solvent to form the water droplets in the polymer solution; and
    vaporizing the water droplets in the polymer solution.

5. The production method according to claim 4,
    wherein a diameter of the water droplets is controlled by varying the humidity of the air to be blown and the air-blowing time to adjust the diameter of the openings of the voids that are formed in the resin film.

6. A method for the production of a slide member, comprising the steps of:
    fabricating a resin film that has a surface in which voids that have a circular opening are arranged at regular intervals in a hexagonal close-packed configuration;
    masking a sliding surface that is made of a metal material with the resin film by bonding the surface of the fabricated resin film to the sliding surface; and
    forming microdimples by bringing an etchant into contact with the sliding surface masked through the voids;
    wherein, in the step of masking the sliding surface, an area ratio of the openings of all the microdimples to the entire sliding surface is adjusted by adjusting an area of the sliding surface to be brought into contact with the etchant in the step of forming the microdimples by adjusting a state of bonding between circumferential edges of the openings of the voids and the sliding surface.

7. The production method according to claim 6,
    wherein, in the step of masking the sliding surface, a bonding strength between circumferential edges of the openings of the voids and the sliding surface is adjusted by adjusting an amount of adhesive that is used to bond the resin film and temperature of heating and time for heating to adjust the area of the sliding surface to be contacted with the etchant.

* * * * *